March 6, 1962  A. C. MAMO  3,023,583
HYDRODYNAMIC TORQUE TRANSMITTING DEVICE
Original Filed Aug. 22, 1955  2 Sheets-Sheet 2
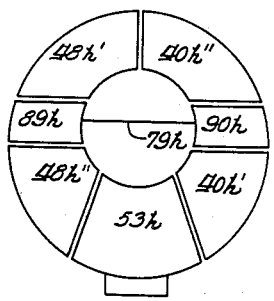
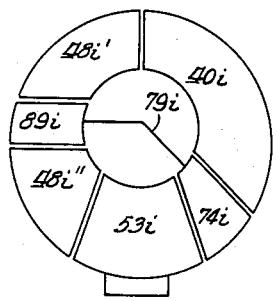
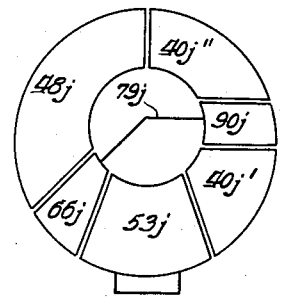
Inventor:
Anthony C. Mamo
By: Frank C. Parker
Atty.

United States Patent Office 3,023,583
Patented Mar. 6, 1962

3,023,583
HYDRODYNAMIC TORQUE TRANSMITTING DEVICE
Anthony C. Mamo, Des Plaines, Ill., assignor to Borg-Warner Corporation, Chicago, Ill., a corporation of Illinois
Original application Aug. 22, 1955, Ser. No. 529,716, now Patent No. 2,954,672, dated Oct. 4, 1960. Divided and this application Jan. 20, 1959, Ser. No. 787,876
10 Claims. (Cl. 60—54)

The present invention relates in general to torque transmitting devices and more particularly to hydraulic torque converters of the type adapted to multiply and transmit torque to a load from a driving engine. The improved form of hydraulic torque converter disclosed herein is particularly suitable for use with a driving engine of the type ordinarily used in automotive vehicles.

This application is a division of my co-pending application, Serial No. 529,716, filed August 22, 1955, now Patent No. 2,954,672, issued October 4, 1960.

The principal object of the present invention is to provide an improved hydraulic torque converter of the type having a plurality of vaned elements which together define a substantially toroidal fluid circuit and wherein the elements include vaned impeller means adapted to be drivingly connected with a driving engine for circulating fluid through the toroidal circuit to impart kinetic energy thereto, vaned turbine means disposed in the path of the circulating fluid for absorbing the kinetic energy from the fluid as it leaves the impeller means, and vaned stator means effective to change the direction of flow of the fluid leaving the turbine means and prior to its return to the impeller means for enabling infinite variation of torque conversion by the converter over a range varying from maximum torque conversion to minimum torque conversion which occurs when the clutch point of the converter is reached and during which condition the converter transmits torque at a substantially one-to-one ratio between the impeller means and the driven or turbine means.

More particularly, the present invention provides a hydraulic torque converter which includes, in addition to the conventional vaned impeller, turbine and stator means, multiple floater elements drivingly interconnected with each other and freely rotatable with respect to the impeller, turbine and stator means, said floater elements being effective to absorb kinetic energy at one point in the toroidal fluid circuit and give up this absorbed kinetic energy to the fluid at a different point in the toroidal circuit so as to provide the multiple advantages which will be described hereafter in the present specification.

In the improved torque converter disclosed herein, the desirable operating characteristics mentioned heretofore are obtained by using the vaned floater elements for absorbing kinetic energy at one point in the toroidal fluid circuit and giving up this kinetic energy at another point in the toroidal fluid circuit. This has the effect of deflecting the fluid at the desired point in the toroidal fluid circuit and in the desired direction in order to change the normal operating characteristics of the converter and provide the advantages outlined above.

Accordingly, it is a more specific object of the present invention to provide a hydraulic torque converter comprising a plurality of relatively rotatable elements which together define a substantially toroidal fluid circuit and which comprise impeller means for imparting kinetic energy to the fluid and effecting circulation thereof to the toroidal circuit, turbine means for absorbing kinetic energy from the fluid, stator means for redirecting the fluid in a more forwardly direction after it leaves the turbine means so as to enable torque multiplication by the converter, and, a plurality of floater devices disposed in toroidally spaced relation with respect to the impeller, turbine and stator means for absorbing energy from the fluid circuit and giving up energy to the fluid circuit at different toroidally spaced points therein and thereby deflecting the fluid from the path which it would normally take to thus alter the operating characteristics of the converter.

In another broad aspect a primary object of the present invention is to provide infinite variation, between predetermined angular limits, in the direction of flow of the fluid entering one of the impeller, turbine or stator devices for thereby infinitely variably effecting the operation of the converter.

This divisional applictaion is directed to the use of the beforementioned new and improved floater devices in torque converters of the type having split elements such as a split impeller or turbine element, or both.

The foregoing and numerous other objects and advantages of the present invention will become apparent from the following detailed description, when read in conjunction with the accompanying drawings, wherein:

FIG. 2 is a schematic illustration of a modified form of torque converter having two rigidly interconnected vaned floater members respectively disposed between spaced portions of the converter impeller means and between spaced portions of the converter turbine means;

FIG. 3 is a schematic illustration of a modified torque converter having rigidly interconnected vaned floater members respectively disposed between the stator and impeller and between spaced portions of the converter turbine means;

FIG. 4 is a schematic illustration of a modified torque converter having the interconnected vaned floater members respectively disposed in toroidally spaced relation between the turbine and stator and between spaced portions of the converter impeller means.

Figure 1:
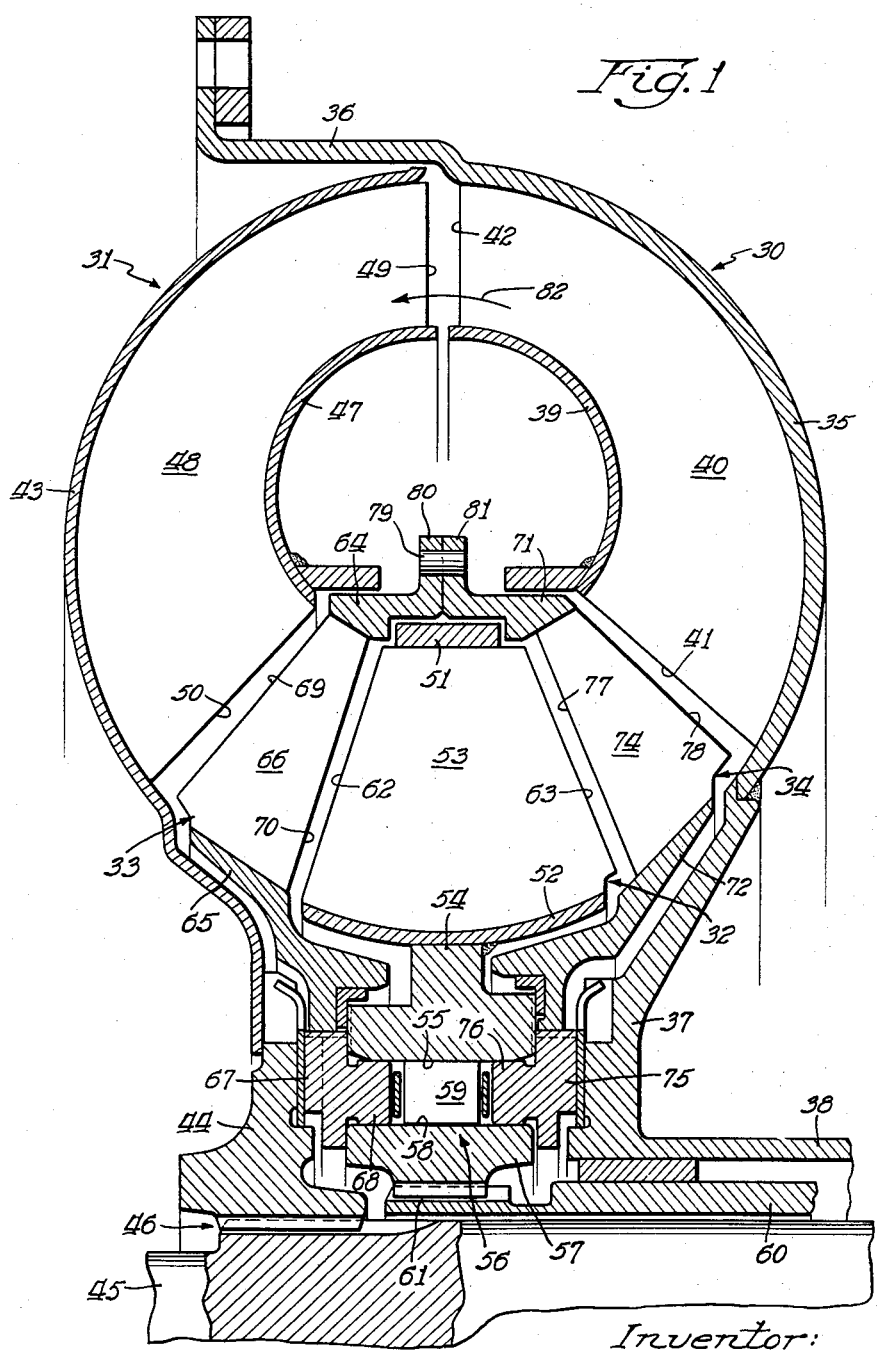
FIG. 1 is a sectional view through the upper half of one preferred form of hydraulic torque converter constructed in accordance with the principles of the present invention.

With reference now to the drawings, wherein like reference numerals have been utilized in the different views to identify identical parts and wherein different letters have been added to the reference numerals to identify corresponding parts in modified forms of the invention, the embodiment illustrated in FIG. 1 of the present application and FIGS. 1–5 of parent Patent No. 2,954,672 will first be described.

With particular reference to FIG. 1, the hydraulic torque converter disclosed therein comprises, in general, an impeller 30, a turbine 31, a stator 32, a first floater member 33 and a second floater member 34.

The impeller 30 comprises an outer annular shell 35 having a forwardly projecting flange portion 36 adapted to be connected in any desired manner to a driving engine or motor, and the outer shell 35 is suitably secured, as by welding, to a generally radially outwardly extending flange 37 formed on the forward end of a rotatably mounted sleeve shaft 38. The impeller 30 also comprises an annular inner shell 39 which, together with the outer shell 35, rigidly supports a plurality of impeller vanes 40. Each of the impeller vanes 40 has an entrance 41 and an exit 42. As is clearly illustrated in FIGS. 2–5 of the parent Patent No. 2,954,672, each of the impeller vanes 40 slopes or slants slightly rearwardly or reversely from its entrance 41 to its exit 42.

The turbine 31 comprises an outer shell 43 which is rigidly secured to a hub 44 suitably splined on a shaft 45, as indicated generally at 46. The shaft 45 is mounted concentrically with respect to the sleeve shaft 38 so as to maintain concentric alignment between the impeller 30 and turbine 31. The turbine 31 also comprises an inner shell 47 which, together with the outer shell 43, supports a plurality of turbine vanes 48. Each of the turbine vanes 48 has an entrance 49 and an exit 50 and it will be noted, particularly from FIGS. 2-5 of the parent Patent No. 2,954,672, that each of the turbine blades 48, when proceeding from the entrance 49 to the exit 50, is curved sloping or slanting generally in a forward direction near the entrance 49 and slanting in a backwardly or reverse direction near the fluid exit 50. It will be understood that fluid leaving the impeller vanes 40 through the exits 42 thereof enters the turbine 31 through the entrances 49 of the turbine blades 48.

The stator 32 comprises a shell 51 and a shell 52 which together suitably support a plurality of stator vanes 53. The shell 52 of the stator 32 is suitably secured, as by welding to a member 54 having an inwardly facing cylindrical surface 55 which comprises the outer race of a one-way engaging device 56. The one-way engaging device 56 also comprises an inner member 57 having an outwardly facing cylindrical surface 58 which forms the inner race of the one-way engaging device 56. The races 55 and 58 are concentrically disposed with respect to each other and are adapted to have a plurality of peripherally spaced tiltable sprags or eccentric gripping devices 59 disposed therebetween. The sprags 59 tilt about their individual axes in one direction to a released condition and thus enable the races 55 and 58 to rotate relatively with respect to each other. When the sprags 59 tilt in the opposite direction they are effective to lock up the two races. The inner member 57 is suitably splined to a sleeve shaft 60, as indicated at 61, with the shaft 60 being disposed concentrically between the shafts 45 and 38 and ordinarily secured to a stationary member. As a result, the stator 32 may rotate freely in a forward direction due to the action of the one-way engaging device 56 but whenever it tends to rotate reversely it is ordinarily held stationary.

Each of the stator vanes 53 has a fluid entrance 62 and a fluid exit 63 and the configuration of each of the stator blades 53 is as shown in FIGS. 2-5 of the parent Patent No. 2,954,672. It will be noted that each stator blade 53 is slanted slightly reversely adjacent its entrance 62 and is slanted considerably forwardly at the fluid exit 63 and throughout a major portion of the surface of the blade 53.

The first floater member 33 is provided with a pair of shells 64 and 65 within which a plurality of first floater blades or vanes 66 are rigidly mounted. The external shell 65 is rotatably mounted on an annular member 67 which is provided with an axially extending portion 68 respectively disposed between the inner race 58 and outer race 55 of the one-way clutch 56. The portion 68 of the annular member 67 serves to hold the concentricity of the first floater member 33 with respect to the impeller 30, turbine 31 and stator 32. Each of the first floater member vanes 66 has an entrance 69 and an exit 70 respectively disposed adjacent the exit 50 of the turbine blades 48 and the entrance 62 of the stator blades 53.

The second floater member 34 comprises a pair of shells 71 and 72 for mounting a plurality of second floater vanes 74. The shell 72 is rotatably mounted on an annular member 75 which is formed with an axially extending portion 76 disposed respectively between the outer race 55 and the inner race 58 of the one-way engaging device 56. The axially extending portion 76 maintains the concentricity of the second floater member 34 with respect to the other vaned elements 30, 31, 32 and 33 of the torque converter. Each of the vanes 74 of the second floater member 34 is provided with an entrance 77 and an exit 78.

The floater members 33 and 34, in the embodiment of the invention disclosed in FIG. 1, are rigidly connected together by means of suitable pins 79 which extend through flanged portions 80 and 81 respectively formed on the shell 64 of the first floater member 33 and the shell 71 of the second floater member 34.

The stator 32, comprising the plurality of peripherally spaced vanes 53 is held against reverse rotation by the one-way engaging device 56 and thus the fluid entering the stator 32 impinges against the forward faces of the stator vanes 53 and leaves the stator in substantially the same direction as the slope of the stator blades at their exits 63. It will be borne in mind that the fluid entering the stator vanes and impinging against the forward faces thereof, tends to drive the stator vanes 53 in a reverse direction. Since the stator 32 is held stationary it acts as a reaction member and enables the hydraulic torque converter to multiply torque between the impeller vanes 40 and the turbine vanes 48.

One of the principal advantages, of the many enumerated in the parent Patent No. 2,954,672 of the torque converter disclosed in FIG. 1 over a conventional torque converter not provided with the floating members 33 and 34 arises from the increased capacity of the torque conveter disclosed herein to handle torque without substantially structurally modifying the impeller, turbine or stator in any way.

From the various embodiments of the invention disclosed heretofore it is apparent that the angular disposition of the floater member vanes may be variable over a wide range of angles. More particularly, the invention contemplates that the limiting factor in determining the range of angular disposition of the floating member vanes, as well as the vanes of the impeller, turbine and stator, will arise from the choking effect on the fluid flowing through the vanes and encountered when a plurality of peripherally arranged vanes or blades are disposed at sharply acute angles with reference either to the direction of rotation of the vanes, or to a direction 180 degrees from the direction of rotation of the vanes. In other words, the present invention contemplates that the angular disposition of the first floater vanes may be anywhere between a direction very near to the direction of rotation of the vanes and a direction 180 degrees from the direction of rotation of the vanes. The present invention further contemplates that the second floater vanes may be angularly disposed in a similar manner.

FIG. 2 discloses a modification of the present invention utilizing a pair of rigidly interconnected floater members having vanes 89h and 90h respectively. In this embodiment the turbine means comprises toroidally spaced vaned portions 48h' and 48h". The impeller means comprises portions 40h' and 40h" which may or may not be rigidly interconnected with each other, as desired. The turbine means comprising toroidally spaced vaned portions 48' and 48" may each be connected to the same output member or may be respectively connected to different output members. The first floater vanes 89h are toroidally disposed between the turbine portions 48h' and 48h" while the second floater vanes 90h are toroidally disposed between the spaced impeller portions 40h' and 40h".

In the embodiment of the invention shown in FIG. 3, the turbine means are split as in FIG. 2 so as to provide toroidally spaced vaned turbine portions 48i' and 48i". A first vaned floater member 89i is disposed in toroidally spaced relation between the turbine portions 48i' and 48i" while a second floater member 74i is disposed in toroidally spaced relation between the stator vanes 53i and impeller vanes 40i.

In the FIG. 4 modification, the impeller means are split as in FIG. 2 to provide toroidally spaced impeller portions 40j' and 40j". One vaned floater member 90j is disposed in toroidally spaced relation between the impeller portions 40j' and 40j" while the other vaned floater member is toroidally disposed between the turbine vanes 48j and stator vanes 53j. The modified forms of the embodiment, which are the subject of this case, operate in a similar manner as the FIG. 1 embodiment, the operation of which is fully described in the parent Patent No. 2,954,672.

Although a plurality of different forms of the FIG. 1 type converter have been disclosed herein in FIGS. 2, 3 and 4, respectively, these variations are not intended to be exhaustive, to any degree whatsoever, of the possible forms in which the present invention may be applied. Rather, the numerous embodiments disclosed are intended primarily to be indicative of the wide scope encompassed by the present invention. It is therefore contemplated that numerous and extensive additional modifications of the present invention may be made without departing from the spirit or scope thereof.

What is claimed is:

1. A hydraulic torque converter having a plurality of elements together defining a substantially toroidal fluid circuit; all of said elements being rotatable about a common axis; said elements comprising vaned impeller means for circulating the fluid through said toroidal circuit and thereby imparting kinetic energy to the fluid, vaned turbine means disposed in the path of the circulating fluid for absorbing kinetic energy from the fluid leaving the impeller vanes, and vaned stator means effective to change the direction of flow of the fluid leaving the turbine means and prior to its return to said impeller means for enabling infinitely variable conversion of torque by said converter; and said elements further including a pair of substantially rigidly interconnected toroidally spaced floater members; one of said vaned means comprising multiple vaned portions having one of said floater members disposed therebetween; said floater members being freely rotatable in either direction during all stages of operation of the converter, and about said axis with respect to said impeller, turbine and stator means; the flow of the fluid respectively leaving said elements being infinitely variable in accordance with variations in said torque conversion between a first set of flow values corresponding to maximum torque conversion by the converter and a second set of flow values corresponding to substantially no torque conversion by the converter; each of said floater members respectively having vanes disposed in the path of the circulating fluid; whereby, for a first predetermined range of said flow values, one of said floater members is effective to absorb kinetic energy from the fluid which is transmitted as torque applied in one direction of rotation to the other floater member which gives up this absorbed kinetic energy to the fluid and, for a second predetermined range of said flow values, the one floater member is effective to absorb kinetic energy from the fluid which is transmitted as torque applied in the opposite direction of rotation to the other floater member which gives up this absorbed kinetic energy to the fluid.

2. A hydraulic torque converter having a plurality of elements together defining a substantially toroidal fluid circuit; all of said elements being rotatable about a common axis; said elements comprising vaned impeller means for circulating the fluid through said toroidal circuit and thereby imparting kinetic energy to the fluid, vaned turbine means disposed in the path of the circulating fluid for absorbing kinetic energy from the fluid leaving the impeller vanes, and vaned stator means effective to change the direction of flow of the fluid leaving the turbine means and prior to its return to said impeller means for enabling infinitely variable conversion of torque by said converter; and said elements further including a pair of substantially rigidly interconnected floater members freely rotatable in said fluid circuit in either direction during all stages of operation of the converter; said impeller means being split to provide multiple vaned portions with one of said floater members disposed therebetween; the turbine means being split to provide multiple vaned portions with the outer floater member disposed therebetween; said floater members being freely rotatable about said axis with respect to said impeller, turbine and stator means; the flow of the fluid respectively leaving said elements being infinitely variable in accordance with variations in said torque conversion between a first set of flow values corresponding to maximum torque conversion by the converter and a second set of flow values corresponding to substantially no torque conversion by the converter; each of said floater members respectively having vanes disposed in the path of the circulating fluid; whereby, for a first predetermined range of said flow values, one of said floater members is effective to absorb kinetic energy from the fluid which is transmitted as torque applied in one direction of rotation to the other floater member which gives up this absorbed kinetic energy to the fluid and, for a second predetermined range of said flow values, the other floater member is effective to absorb kinetic energy from the fluid which is transmitted as torque applied in the opposite direction of rotation to the other floater member which gives up this absorbed kinetic energy to the fluid.

3. A hydraulic torque converter having a plurality of elements together defining a substantially toroidal fluid circuit; all of said elements being rotatable about a common axis; said elements comprising vaned impeller means for circulating the fluid through said toroidal circuit and thereby imparting kinetic energy to the fluid, vaned turbine means disposed in the path of the circulating fluid for absorbing kinetic energy from the fluid leaving the impeller vanes, and vaned stator means effective to change the direction of flow of the fluid leaving the turbine means and prior to its return to said impeller means for enabling infinitely variable conversion of torque by said converter; and said elements further including a pair of substantially rigidly interconnected floater members freely rotatable in said fluid circuit in either direction during all stages of operation of the converter; said turbine means being split to provide multiple vaned portions with one of said floater members being disposed therebetween; the other floater member being toroidally disposed between said stator and impeller means; said floater members being freely rotatable about said axis with respect to said impeller, turbine and stator means; the flow of the fluid respectively leaving said elements being infinitely variable in accordance with variations in said torque conversion between a first set of flow values corresponding to maximum torque conversion by the converter and a second set of flow values corresponding to substantially no torque conversion by the converter; each of said floater members respectively having vanes disposed in the path of the circulating fluid; whereby, for a first predetermined range of said flow values, one of said floater members is effective to absorb kinetic energy from the fluid, which is transmitted as torque applied in one direction of rotation to the other floater member which gives up this absorbed kinetic energy to the fluid and, for a second predetermined range of said flow values, the one floater member is effective to absorb kinetic energy from the fluid which is transmitted as torque applied in the opposite direction of rotation to the other floater member which gives up this absorbed kinetic energy to the fluid.

4. A hydraulic torque converter having a plurality of elements together defining a substantially toroidal fluid circuit; all of said elements being rotatable about a common axis; said elements comprising vaned impeller means for circulating the fluid through said toroidal circuit and thereby imparting kinetic energy to the fluid, vaned turbine means disposed in the path of the circulating fluid for absorbing kinetic energy from the fluid leaving the impeller vanes, and vaned stator means effective to change the direction of flow of the fluid leaving the turbine means and prior to its return to said impeller means for enabling infinitely variable conversion of torque by said converter; and said elements further including a pair of substantially rigidly interconnected floater members freely rotatable in said fluid circuit in either direction during all stages of operation of the converter; said impeller means being split to provide multiple vaned portions with one of said floater members disposed therebetween; the other floater member being toroidally disposed between said turbine and said stator means; said floater members being freely rotatable about said axis with respect to said impeller, turbine and stator means; the flow of the fluid respectively leaving said elements being infinitely variable in accordance with variations in said torque conversion between a first set of flow values corresponding to maximum torque conversion by the converter and a second set of flow values corresponding to substantially no torque conversion by the converter; each of said floater members respectively having vanes disposed in the path of the circulating fluid; whereby, for a first predetermined range of said flow values, one of said floater members is effective to absorb kinetic energy from the fluid, which is transmitted as torque applied in one direction of rotation to the other floater member which gives up this absorbed kinetic energy to the fluid, and, for a second predetermined range of said flow values, the one floater member is effective to absorb kinetic energy from the fluid which is transmitted as torque applied in the opposite direction of rotation to the other floater member which gives up this absorbed kinetic energy to the fluid.

5. A device as claimed in claim 1 wherein at least said impeller means consists of multiple toroidally spaced vaned elements having one of said floater elements disposed therebetween and another of said floater elements being disposed between other adjacent ones of said primary fluid circulating means.

6. A device as claimed in claim 1 wherein at least said turbine means consists of multiple toroidally spaced vaned elements having one of said floater elements disposed therebetween and another of said floater elements being disposed between other adjacent ones of said primary fluid circulating means.

7. A device as claimed in claim 1 wherein one of said impeller and turbine means consists of multiple toroidally spaced vaned elements having one of said floater elements disposed therebetween and another of said floater elements being disposed between said stator means and the other of said impeller and turbine means.

8. A device as claimed in claim 1 wherein said vaned impeller means comprises multiple vaned portions having one of said vaned floater members disposed therebetween; said vaned turbine means comprising multiple vaned portions having the other of said vaned floater members disposed therebetween.

9. A device as claimed in claim 1 wherein said vaned turbine means comprises multiple vaned portions having one of said vaned floater members disposed therebetween; the other of said floater members being disposed in toroidally spaced relation immediately between said vaned stator and impeller means.

10. A device as claimed in claim 1 wherein said vaned impeller means comprises multiple vaned portions having one of said vaned floater members disposed therebetween; the other of said floater members being disposed in toroidally spaced relation immediately between said vaned turbine and stator means.

References Cited in the file of this patent
UNITED STATES PATENTS

| | | |
|---|---|---|
| 2,196,585 | Gette | Apr. 9, 1940 |
| 2,762,197 | Ullery | Sept. 11, 1956 |